(12) United States Patent
Sato et al.

(10) Patent No.: US 7,633,243 B2
(45) Date of Patent: Dec. 15, 2009

(54) LIGHTING CONTROL DEVICE AND CONTROL METHOD

(75) Inventors: Kazuhiko Sato, Kasugai (JP); Hirohito Miyazaki, Gifu (JP); Izumi Yamada, Kasugai (JP); Akihiro Kakamu, Nagoya (JP); Masaru Ishizaki, Wako (JP)

(73) Assignees: OMRON Corporation, Kyoto (JP); Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 11/877,359

(22) Filed: Oct. 23, 2007

(65) Prior Publication Data
US 2008/0106204 A1 May 8, 2008

(30) Foreign Application Priority Data
Oct. 27, 2006 (JP) ............................. 2006-292566

(51) Int. Cl.
H05B 37/02 (2006.01)
(52) U.S. Cl. ....................................... 315/291; 315/307
(58) Field of Classification Search ............. 315/209 R, 315/224, 225, 245, 247, 291, 307
See application file for complete search history.

(56) References Cited
U.S. PATENT DOCUMENTS
5,418,435 A * 5/1995 Yamada ...................... 315/308
6,239,558 B1 * 5/2001 Fujimura et al. ............. 315/307
6,545,513 B2 * 4/2003 Tsuchida et al. ............. 327/108
7,511,432 B2 * 3/2009 Watanabe et al. ........ 315/209 R FOREIGN PATENT DOCUMENTS
| JP | 08-185024 | 2/1998 |
| JP | 09-292639 | 5/1999 |
| JP | 11-101699 | 10/2000 |
| JP | 11-109040 | 11/2000 |

* cited by examiner

*Primary Examiner*—Douglas W Owens
*Assistant Examiner*—Jimmy T Vu
(74) *Attorney, Agent, or Firm*—Weaver Austin Villeneuve & Sampson LLP

(57) ABSTRACT

In a headlamp luminance controlling device, a CPU 21 first decides a luminance factor D based on a state of each switch 10 to switch 12 and a signal from a sensor 13. The CPU 21 determines an initial value of a PWM duty ratio S from the luminance factor D with a load current Ap as a default value (rated current A0). The CPU 21 starts the initial driving of a headlamp HL using the duty ratio S. The CPU 21 then determines the luminance factor D based on the state of each switch 10 to switch 12 and the signal from the sensor 13. Next, the CPU 21 determines the PWM duty ratio S based on the luminance factor D and the load current Ap detected by the headlamp current detector 23. The CPU 21 drives the headlamp HL using the PWM duty ratio S.

6 Claims, 8 Drawing Sheets

E : POWER SUPPLY VOLTAGE
Ap : LOAD CURRENT (PEAK VALUE)
R1,R2 : ELECTRICAL RESISTANCE OF LOAD LINE
PWM DUTY RATIO : S

LIGHTING CONTROL DEVICE AND CONTROL METHOD

This application claims priority on Japanese Patent Application 2006-292566 filed Oct. 27, 2006.

BACKGROUND OF THE INVENTION

1. Field of the Invention

The present invention relates to a lighting control device and a control method. In particular, the present invention relates to a lighting control device and a lighting control method suitable for use in controlling an amount of light from a headlamp of a vehicle, such as an automobile.

2. Description of the Related Art

Generally, a technology is known in which glare experienced by an oncoming vehicle, a leading vehicle, a pedestrian, and the like is suppressed without compromising peripheral visibility by light from a headlamp being dimmed. A device that can extend battery life and headlamp life by dimming the light from the headlamp and suppressing unnecessary power consumption is also proposed. As such conventional technologies, for example, a method is proposed in which a headlamp is controlled using a predetermined pulse width modulation (PWM) duty ratio corresponding to a requested fade rate (such as Japanese Patent Laid-Open (Kokai) Publication No. 10-029462).

FIG. 8 is a block diagram of a configuration of a lighting control device according to the conventional technology.

In the diagram, a central processing unit (CPU) 1 determines an appropriate fade rate based on a state of each switch 10 to 12 and a signal from a sensor 13. The CPU 1 performs PWM control on a gate voltage of a field-effect transistor (FET) 2 using a predetermined duty ratio S, thereby controlling a drive current sent to a headlamp HL. The predetermined duty ratio S corresponds with the fade rate. As a result, the CPU 1 controls the luminance of the headlamp HL. The CPU 1 can control the luminance of the headlamp HL using only the duty ratio S, without changing the gate voltage value of the FET 2. Therefore, PWM control is very efficient compared to a rheostatic control method. PWM control is a method that is generally used today.

Control can be easily performed if correspondence between the requested fade rate and the PWM duty ratio when the control is actually performed has a correlation that can be expressed by a linear function. Therefore, a technology is known in which control is performed using a duty ratio that has been changed to fulfill values provided as targets (current value, luminance, etc.). Such technology is, for example, disclosed in Japanese Patent No. 3061050, Japanese Patent No. 3063755, and Japanese Patent Laid-Open (Kokai) Publication No. 11-126696.

However, in the above-described conventional technology (Japanese Patent Laid-Open (Kokai) Publication No. 10-029462), the relationship between the requested fade rate and the PWM duty ratio when the control is actually performed is unclear.

Correction taking into consideration fluctuations in the power supply voltage, wiring resistance, and the like, and a difference in the electrical current between a left headlamp and a right headlamp is not made. Therefore, the error in the luminance of the headlamp actually being controlled increases with regard to the requested fade rate. Moreover, a difference in luminance between the left headlamp and the right headlamp occurs.

As a result of individual characteristics (resistance value, etc.) of the headlamps, wiring, and the like being used, the fade rate and the duty ratio often have a non-linear relationship or a correlation that is difficult to mathmatize. However, in the above-described conventional technologies (Japanese Patent No. 3061050, Japanese Patent No. 3063755, and Japanese Patent Laid-open Publication No. 11-126696), control is performed under a presumption that the correlation is linear. Therefore, control under a presumption that the correlation is nonlinear is impossible to attain.

SUMMARY OF THE INVENTION

The present invention has been conceived in light of the foregoing situations, and is to provide a lighting control device and a lighting control method in which fluctuation in the luminance of a headlamp caused by fluctuations in power supply voltage, wiring resistance, and the like can be suppressed and, regardless of the kind of correlation between a fade rate or a luminance factor (referred to, hereinafter, as the luminance factor) and a duty ratio, the headlamp can be illuminated with luminance having fidelity towards a desired luminance factor.

In order to achieve the above-described purpose, in accordance with one aspect of the present invention, there is provided a lighting control device for controlling a luminance of a lighting means by performing pulse width modulation control on voltage applied to the lighting means comprising: a current detecting means for detecting a load current applied to the lighting means; a duty ratio deciding means for deciding a duty ratio used in the pulse width modulation control such that the duty ratio is $(A1/Ap)^2$, based on a theoretical value electric current A1 set based on a predetermined luminance factor provided for the lighting means and a load current Ap detected by the lead current detecting means; and a modulation controlling means for performing the pulse width modulation control on the voltage applied to the lighting means using the duty ratio decided by the duty ratio deciding means.

In accordance with another aspect of the present invention, there is provided a lighting control method for controlling a luminance of a lighting means by performing pulse width modulation control on voltage applied to the lighting means comprising the steps of: detecting a load current applied to the lighting means; deciding a duty ratio used in the pulse width modulation control such that the duty ratio is $(A1/Ap)^2$, based on a theoretical value electric current A1 set based on a predetermined luminance factor provided for the lighting means and a load current Ap detected by the lead current detecting means; and performing the pulse width modulation control on the voltage applied to the lighting means using the duty ratio decided by the duty ratio deciding means.

According to the present invention, fluctuation in the luminance of the headlamp caused by fluctuations in power supply voltage, wiring resistance, and the like can be suppressed. The headlamp can be illuminated with luminance having fidelity towards a desired fade rate.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will be hereinafter described in detail with reference to the preferred embodiments shown in the accompanying drawings.

A. First Embodiment

A-1. Configuration According to the First Embodiment

Figure 1:
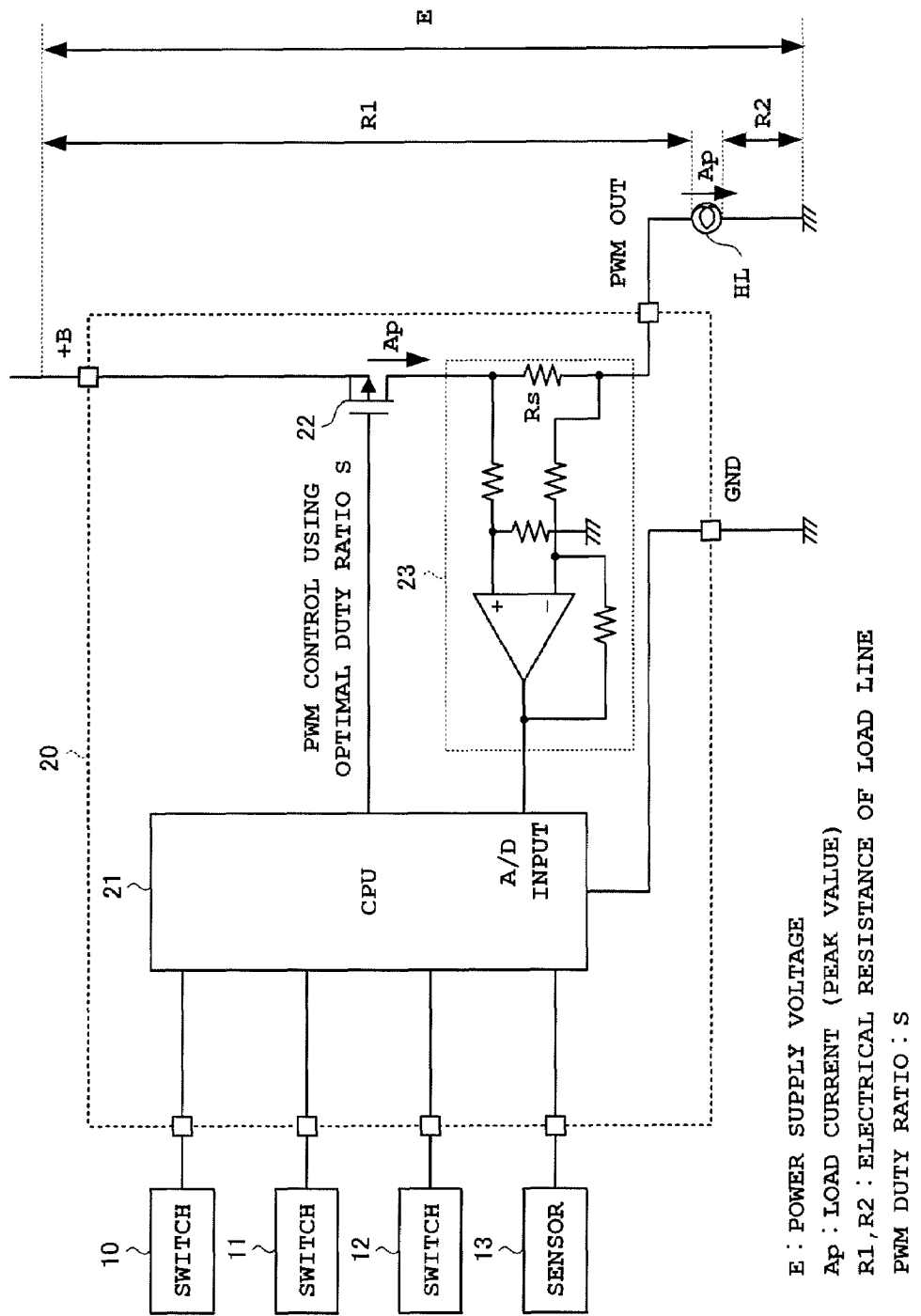
FIG. 1 is a block diagram of a configuration of a headlamp luminance controlling device according to a first embodiment of the present invention.
Figure 8:
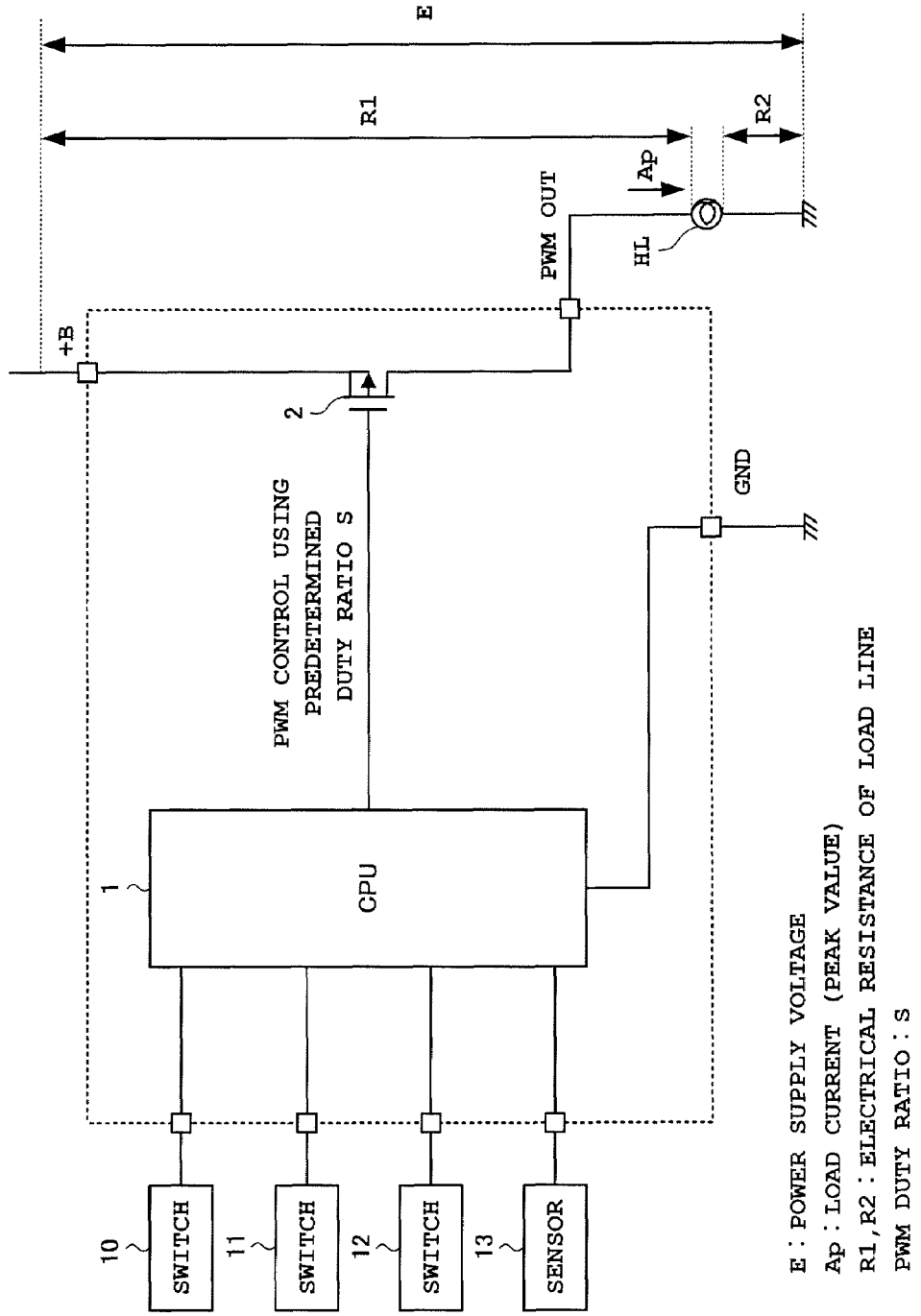
FIG. 8 is a block diagram of a configuration of a headlamp controlling device according to a conventional technology.

FIG. 1 is a block diagram of a configuration of a headlamp luminance controlling device (lighting control device) according to a first embodiment of the invention. Sections corresponding to those in FIG. 8 are given the same reference numbers. Explanations thereof are omitted.

In FIG. 1, a headlamp luminance controlling device 20 includes a CPU 21, an FET 22, and a headlamp current detector 23. The CPU 21 determines an appropriate luminance factor D based on a state of each switch 10 to 12 and a signal from a sensor 13. The CPU 21 determines a duty ratio S based on the luminance factor D and a load current (peak value) Ap of a headlamp HL. The headlamp current detector 23, described hereafter, detects the load current Ap. The CPU 21 drives the FET 22 and performs PWM control using the duty ratio S.

Figure 2:
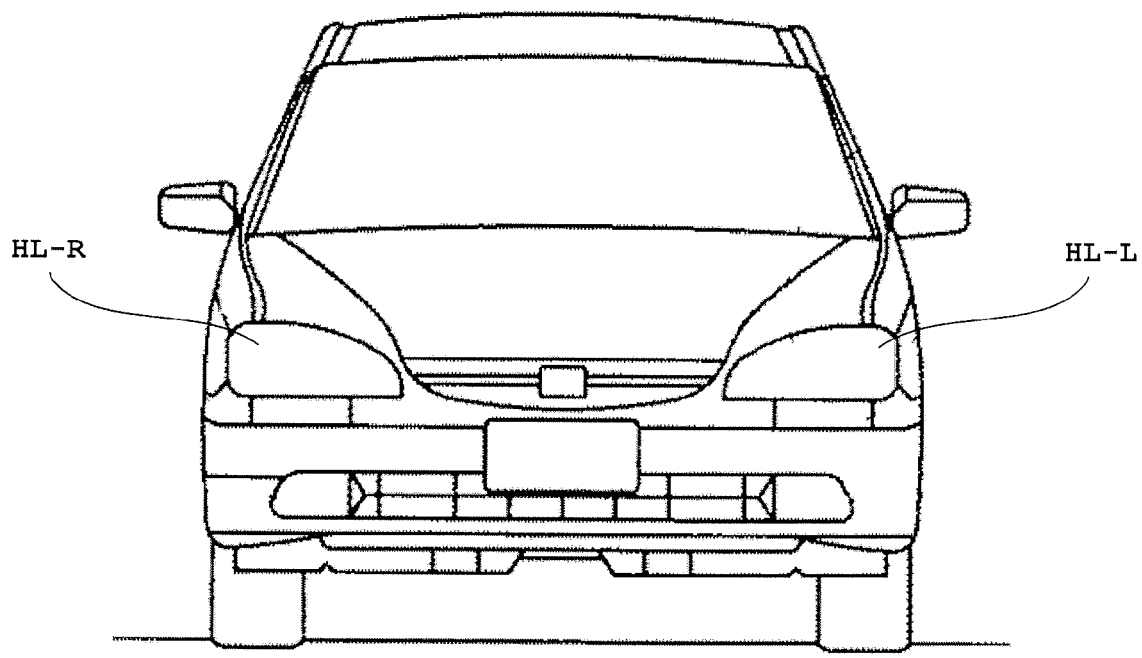
FIG. 2 is a schematic diagram of an example of a headlamp arrangement on an automobile.

The FET 22 supplies the headlamp HL with the load current Ap using the duty ratio S adhering to the PWM control performed by the CPU 21. The headlamp current detector 23 (current detecting means) detects the load current Ap supplied to the headlamp HL via the FET 22, via a shunt resistor Rs. The headlamp current detector 23 amplifies the load current Ap by about 20 times and supplies the amplified load current AP to the CPU 21. As shown in FIG. 2, the headlamps HL (lighting means) are disposed on a front-left end and a front-right end of an automobile. According to the first embodiment, only control of one headlamp HL is described.

The CPU 21 realizes functions of a duty ratio deciding means and a luminance factor deciding means. The FET 22 realizes a function of the modulation controlling means.

Next, an example of a duty ratio calculation during PWM control performed by the CPU 21 will be described (a to c indicates procedures).

(a) First, the luminance factor D is determined as expressed in the following equation (1):

[Equation 1]

$$D = (V1/V0)^m \quad (1)$$

here, V0 is a rated voltage (12 volts) of the load. m is a constant number determined based on the load (about 3.1). As a result of the equation (1), an effective voltage V1 of the headlamp HL during dimming is as expressed in the following equation (2).

[Equation 2]

$$V1/V0 = D^{1/m} \quad (2)$$

(b) Next, the voltage applied to the headlamp HL is replaced with the current. As a result, an effective current A1 (equivalent to theoretical value electric current in the claims) of the headlamp used to realize the luminance factor D is as expressed in the following equation (3).

[Equation 3]

$$A1/A0 = (V1/V0)^n \quad (3)$$

Here, A0 is a rated current (5A) of the headlamp HL. n is a constant number (about 0.57) determined based on the headlamp HL. As a result of the equation (3), the following equation (4) is acquired.

[Equation 4]

$$A1 = A0 \cdot (V1/V0)^n \quad (4)$$

The following equation (5) can be acquired by the equation (2) being assigned in the equation (4) [Equation 5]

$$A1 = A0 \cdot D^{n/m} \quad (5)$$

(c) When the load current (actual measurement) of the headlamp HL is Ap, the effective current A2 at this time is expressed by the following equation (6) using the PWM duty ratio S.

[Equation 6]

$$A2 = S^{0.5} \cdot Ap \quad (6)$$

Here, when A2=A1, the actual headlamp HL is illuminated at a luminance factor D. Therefore, the PWM duty ratio S is an optimal value and does not require change.

When A2>A1, the actual headlamp HL is illuminated to be brighter than the luminance factor D. As a result of the PWM duty ratio S being changed to, for example, $S2 = (A1/A2)^2 \cdot S$ (the PWM duty ratio decreases), the actual headlamp HL becomes closer to the luminance factor D. Here, when the equation (6) is assigned, $S2 = (A1/Ap)^2$ can be expressed.

When A2<A1, the actual headlamp HL is illuminated to be darker than the luminance factor D. When the PWM duty ratio is changed to $S2 = (A1/A2)^2 \cdot S$ at this time as well, this time, the duty ratio S increases. The actual headlamp HL becomes closer to the luminance factor D.

Even when the duty ratio S is changed to S2 expressed in $S2 = (A1/A2)^2 \cdot S$, in actuality, the load current (actual measurement) Ap decreases. Therefore, the luminance of the headlamp HL does not become the optimal value at once, but instead becomes asymptotically closer to the optimal value. In addition, the values 2(A1/A2), (A1/A2), and the like can be used as the coefficient $(A1/A2)^2$ determining the amount of change to the PWM duty ratio. When taking into consideration that the luminance factor D and the duty ratio S often have a nonlinear correlation, the coefficient $(A1/A2)^2$ can be considered more advantageous to bring the luminance of the headlamp HL closer to the optimal value.

Next, a method of determining the load current Ap will be described.

(a) The load current Ap is a default value when PWM drive is started. The default value is, for example, a rated current value A0.

(b) During electrification (while the PWM signal is held LOW), the CPU 21 inputs a voltage value Ep generated in the shunt resistor Rs (analog-digital [AD] conversion input) and calculates the load current Ap of the headlamp HL. The load current Ap is Ap=Ep/Rs (Rs is a constant number). For example, when Rs=20 mΩ and Ep=0.12V, the load current Ap=6A.

A-2. Operation According to the First Embodiment

Next, an operation performed by the headlamp luminance controlling device according to the first embodiment will be described.

Figure 3:
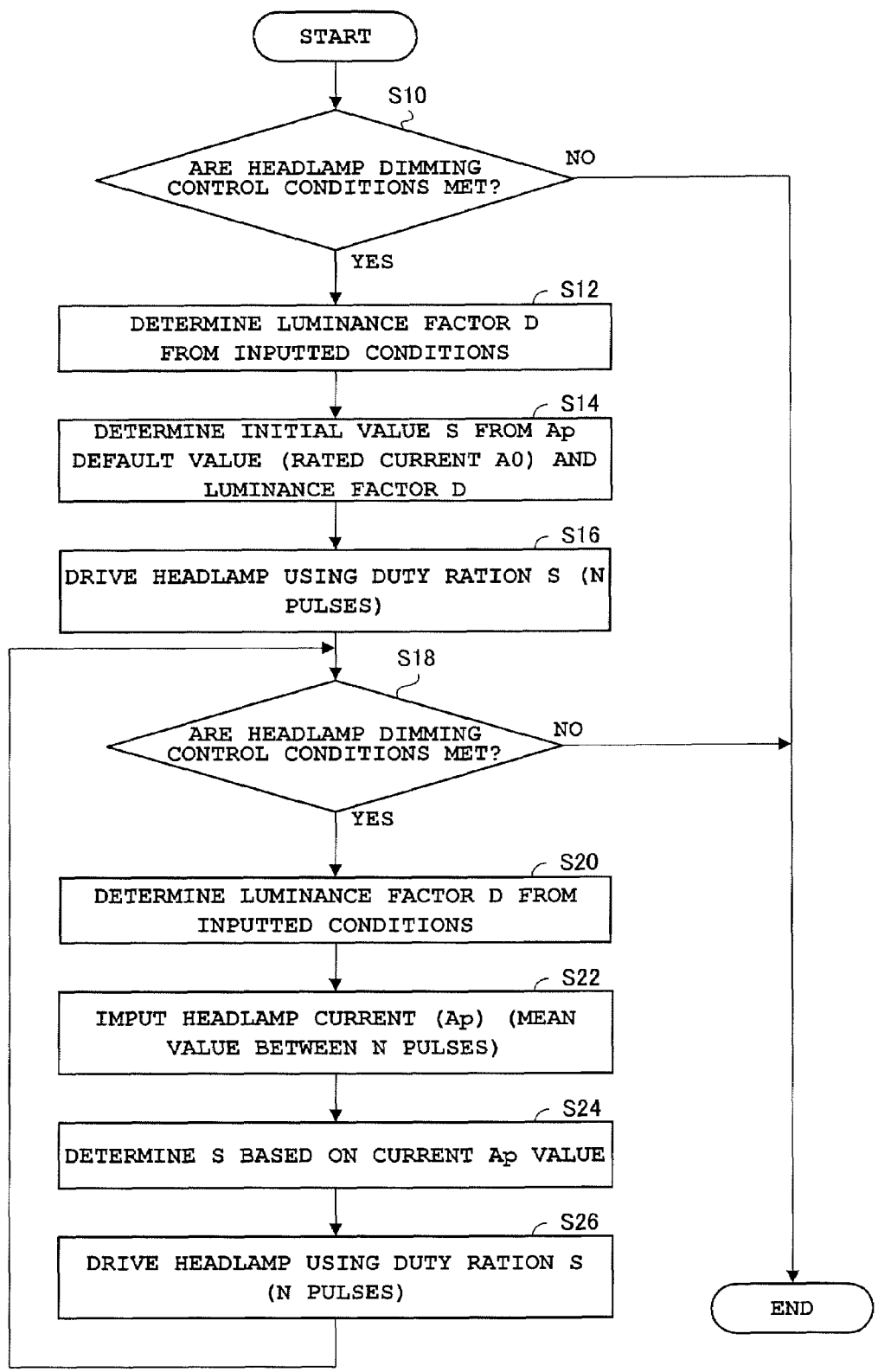
FIG. 3 is a flowchart explaining an operation performed by the headlamp luminance controlling device according to the first embodiment.

FIG. 3 is a flowchart explaining the operation performed by the headlamp luminance controlling device according to the first embodiment.

First, the CPU 21 judges whether headlamp dimming control conditions are met based on the state of each switch 10 to 12 and a signal from the sensor 13 (Step S10). The headlamp dimming control conditions being met are equivalent to, for example, whether a lighting switch is operated to illuminate the headlamp, whether illumination outside of the automobile is less than a predetermined amount, and the like. When the headlamp dimming control conditions are met, the CPU 21 determines the luminance factor D from the inputted conditions (Step S12). Next, the CPU 21 determines an initial value of the PWM duty ratio S from the luminance factor D with the load current Ap as the default value (rated current A0) (Step S14). The CPU 21 drives the headlamp HL by N pulses, using the duty ratio S (Step S16). The steps S10 to S16 stated above are the operation performed when the PWM drive is started.

Next, the CPU 21 judges whether the headlamp dimming control conditions are met based on the state of each switch 10 to 12 and the signal from the sensor 13 (Step S18). When the headlamp dimming control conditions are met, the CPU 21 determines the luminance factor D from the inputted conditions (Step S20). Next, the CPU 21 inputs the load current Ap detected by the headlamp current detector 23 and calculates a mean value between N pulses (Step S22). The CPU 21 determines the PWM duty ratio S based on the current load current Ap (Step S24). The CPU 21 drives the headlamp HL using the PMW duty ratio S (Step S26). Hereafter, the CPU 21 repeats Step S18 to Step S26 and performs PWM control of the headlamp HL until the headlamp dimming control conditions are not met.

According to the first embodiment described above, the relationship between the requested fade rate and the PWM duty ratio when control is actually performed can be uniquely determined. The fluctuation in the fade rate caused by fluctuations in the power supply voltage E, the wiring resistance R1, and the wiring resistance R2 can be suppressed.

B. Second Embodiment

Next, the invention according to a second embodiment will be described.

According to the second embodiment, the case where luminance factor D data is transmitted from an external unit via a controller area network (CAN) will be described. CAN is standardized in vehicles, such as automobiles. The CAN is a serial communication protocol used to perform data communication among a large number of electronic control devices installed in a vehicle, such as the automobile.

Figure 4:
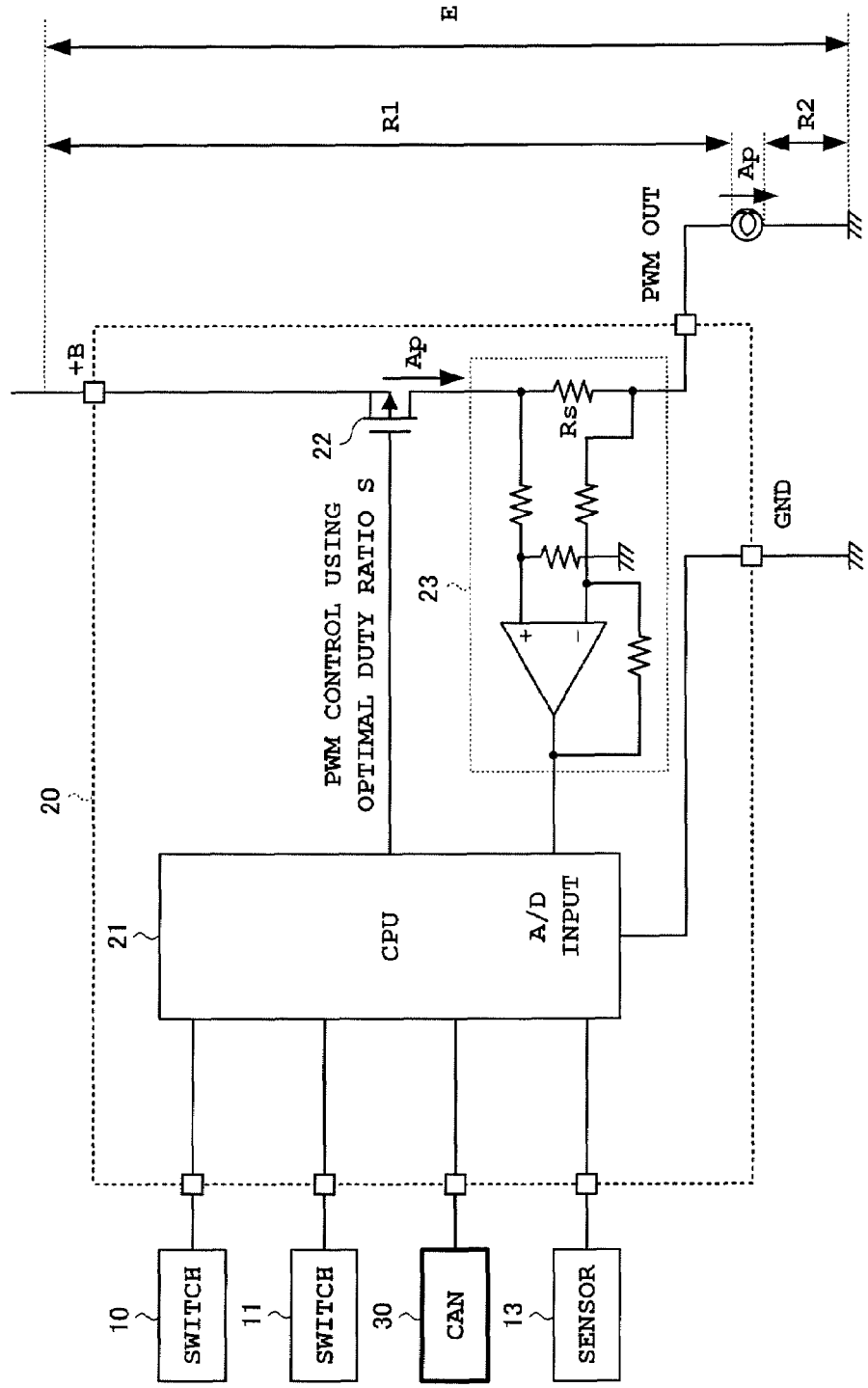
FIG. 4 is a block diagram of a configuration of a headlamp luminance controlling device according to a second embodiment of the invention.

FIG. 4 is a block diagram of a configuration of the headlamp luminance controlling device according to the second embodiment. Sections corresponding to those in FIG. 1 are given the same reference numbers. Explanations thereof are omitted. As shown in FIG. 4, according to the second embodiment, the CPU 21 receives the luminance factor D data determined in adherence to a judgment criterion of the external unit. The data is received via a CAN interface 30. The luminance factor D is consecutively changed by the external unit based on an external state. The CPU 21 determines the optimal PWM duty ratio S based on the luminance factor D and the load current Ap of the headlamp HL detected by the headlamp current detector 23. The CPU 21 drives the FET 22 and performs PWM control using the PWM duty ratio.

According to the second embodiment described above, light of the headlamp can be adapted (in other words, illuminated or controlled) in correspondence to driving conditions with further precision, compared to automatic ON/OFF control of the headlamp.

C. Third Embodiment

Next, the invention according to the third embodiment will be described.

Figure 5:
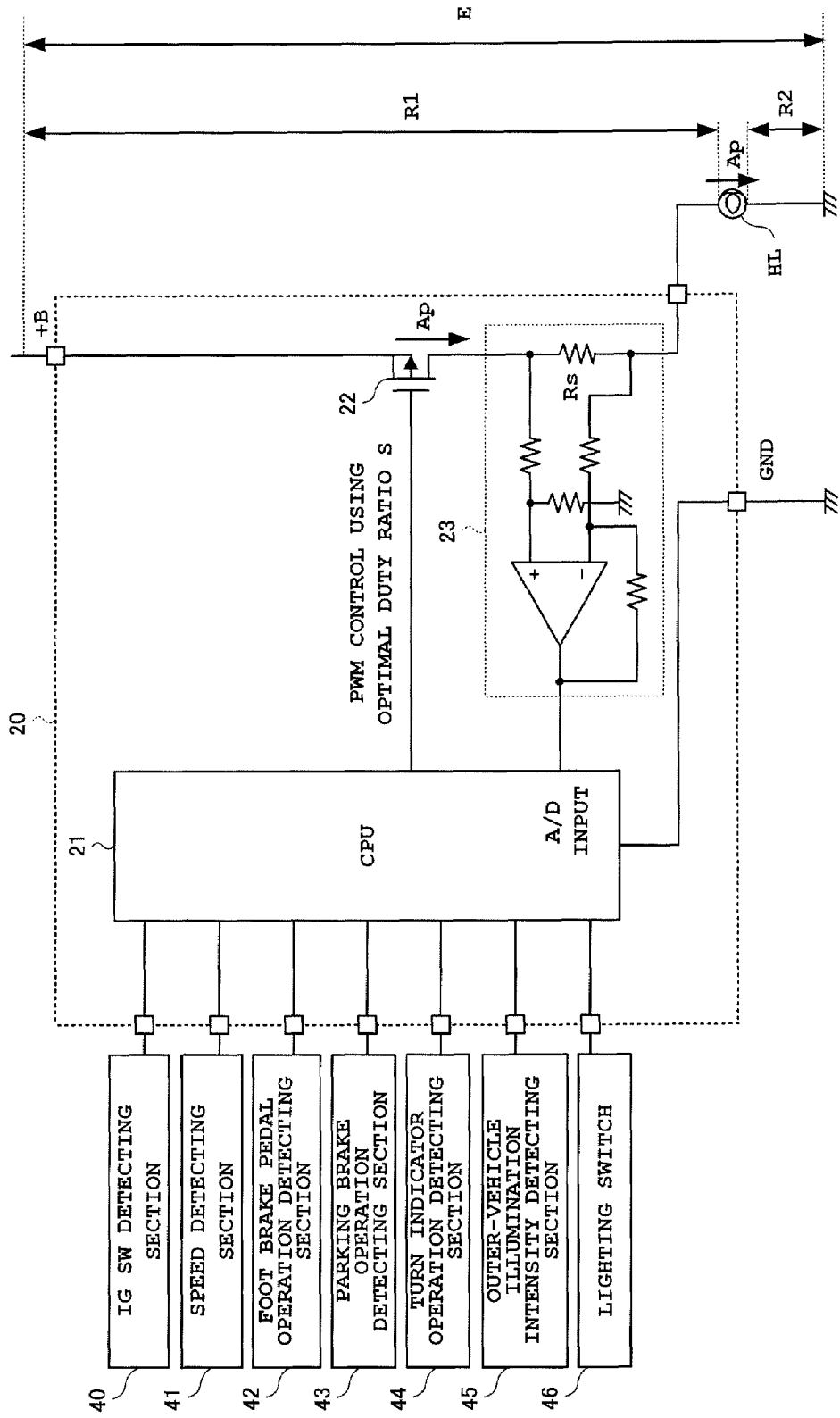
FIG. 5 is a block diagram of a configuration of a headlamp luminance controlling device according to a third embodiment of the invention.

FIG. 5 is a block diagram of a configuration of the headlamp luminance controlling device according to the third embodiment. Sections corresponding to those in FIG. 1 are given the same reference numbers. Explanations thereof are omitted. According to the third embodiment, as shown in FIG. 5, an ignition switch (IG SW) detecting section 40, a speed detecting section 41, a foot brake pedal operation detecting section 42, a parking brake operation detecting section 43, a turn indicator operation detecting section 44, an outer-vehicle illumination intensity detecting section 45, and a lighting switch 46 are used as the switches and sensors.

The ignition switch detecting section 40 detects ON and OFF of the engine based on the ON and OFF of the switch of a key cylinder. The key cylinder is generally operated through key operation. The speed detecting section 41 detects speed from a speedometer or the like. The foot brake pedal operation detecting section 42 detects whether a driver is pressing a foot brake pedal and controlling the foot brake pedal. The parking brake operation detecting section 43 detects whether a parking brake is being used to stop the automobile when stopping for a red light at an intersection or the like.

The turn indicator operation detecting section 44 detects whether a turn indicator for turning left or turning right is blinking (in other words, being operated) or not blinking (in other words, not being operated). The outer-vehicle illumination intensity detecting section 45 detects illumination intensity outside of the vehicle using a light-receiving sensor or the like. The lighting switch 46 is a switch for manually turning on and turning off the headlamp HL.

The CPU 21 determines the appropriate luminance factor D based on signals from the ignition switch detecting section 40, the speed detecting section 41, the foot brake pedal operation detecting section 42, the parking brake operation detecting section 43, the turn indicator operation detecting section 44, the outer-vehicle illumination intensity detecting section 45, and the lighting switch 46.

For example, when the ignition switch detecting section 40 detects that the engine is turned ON, the CPU 21 starts the headlamp HL control. When the dimming control of the headlamp HL is performed, for example, the speed detecting section 41 detects the speed. When the vehicle is running, whether the headlamp HL is turned on or turned off is determined based on the outer-vehicle illumination intensity detected by the outer-vehicle illumination intensity detecting section 45. When the headlamp is turned on, the luminance factor D of the headlamp HL is also determined based on the outer-vehicle illumination intensity detected by the outer-vehicle illumination intensity detecting section 45.

The CPU 21 judges whether the vehicle has temporarily stopped because of a traffic light, is waiting to make a left turn or a right turn, or the like, based on the operation states of the foot brake pedal and a side brake or the operation state of the turn indicator. The operation states of the foot brake pedal and the side brake are detected by the foot brake pedal operation detecting section 42 and the parking brake operation detecting section 43. The operation state of the turn indicator is detected by the turn indicator operation detecting section 44. The CPU 21 determines the luminance factor D of the headlamp HL based on the operation states.

Then, the CPU 21 determines the optimal PWM duty ratio S based on the luminance factor D and the load current Ap of the headlamp HL detected by the headlamp current detector 23. The CPU 21 drives the FET 22 and performs PWM control using the PWM duty ratio S.

According to the third embodiment described above, the CPU 21 determines the luminance factor D of the headlamp HL based on the automobile state (whether the automobile is running, temporarily stopping while waiting for a red light or the like, or waiting to make a left turn or right turn). Therefore, vehicles and pedestrians can be appropriately checked. Moreover, unnecessary battery discharge while waiting for a red light or during a traffic jam can be prevented.

D. Fourth Embodiment

Figure 6:
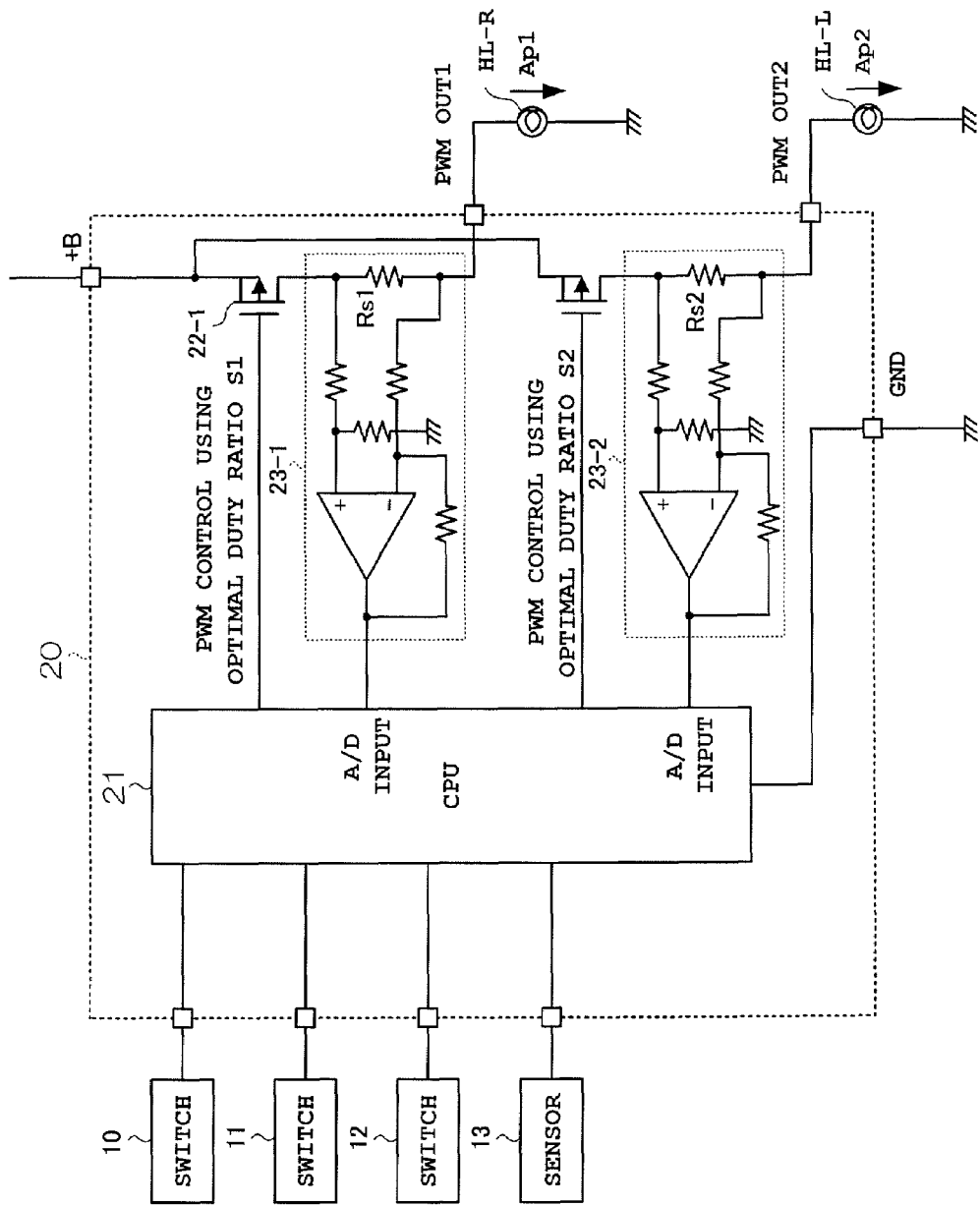
FIG. 6 is a block diagram of a configuration of a headlamp luminance controlling device according to a fourth embodiment of the invention.

FIG. 6 is a block diagram of a configuration of a headlamp luminance controlling device according to a fourth embodiment. Sections corresponding to those in FIG. 1 are given the same reference numbers. Explanations thereof are omitted. According to the fourth embodiment, separate FET 22-1 and FET 22-2 and headlamp current detector 23-1 and headlamp current detector 23-2 corresponding to the left and right headlamps HL in FIG. 2 are provided.

The CPU 21 determines the appropriate luminance factor D based on the state of each switch 10 to switch 12 and the signal from the sensor 13. The CPU 21 determines a duty ratio S1 and a duty ratio S2 based on the luminance factor D, and a load current Ap1 and a load current Ap2 of the headlamp HL-R and the headlamp HL-L. The load current Ap1 and the load current Ap2 are detected by each headlamp current detector 23-1 and headlamp current detector 23-2. The CPU 21 drives each headlamp HL-R and HL-L using each optimal PWM duty ratio S1 and S2. As a result, the CPU 21 corrects differences in applied voltages and wiring resistances that differ in the load lines of the right headlamp HL-R and the left headlamp HL-L. The CPU 21 illuminates the right headlamp HL-R and the left headlamp HL-L with the same luminance.

Next, an operation performed by the headlamp luminance controlling device according to the fourth embodiment will be described.

Figure 7:
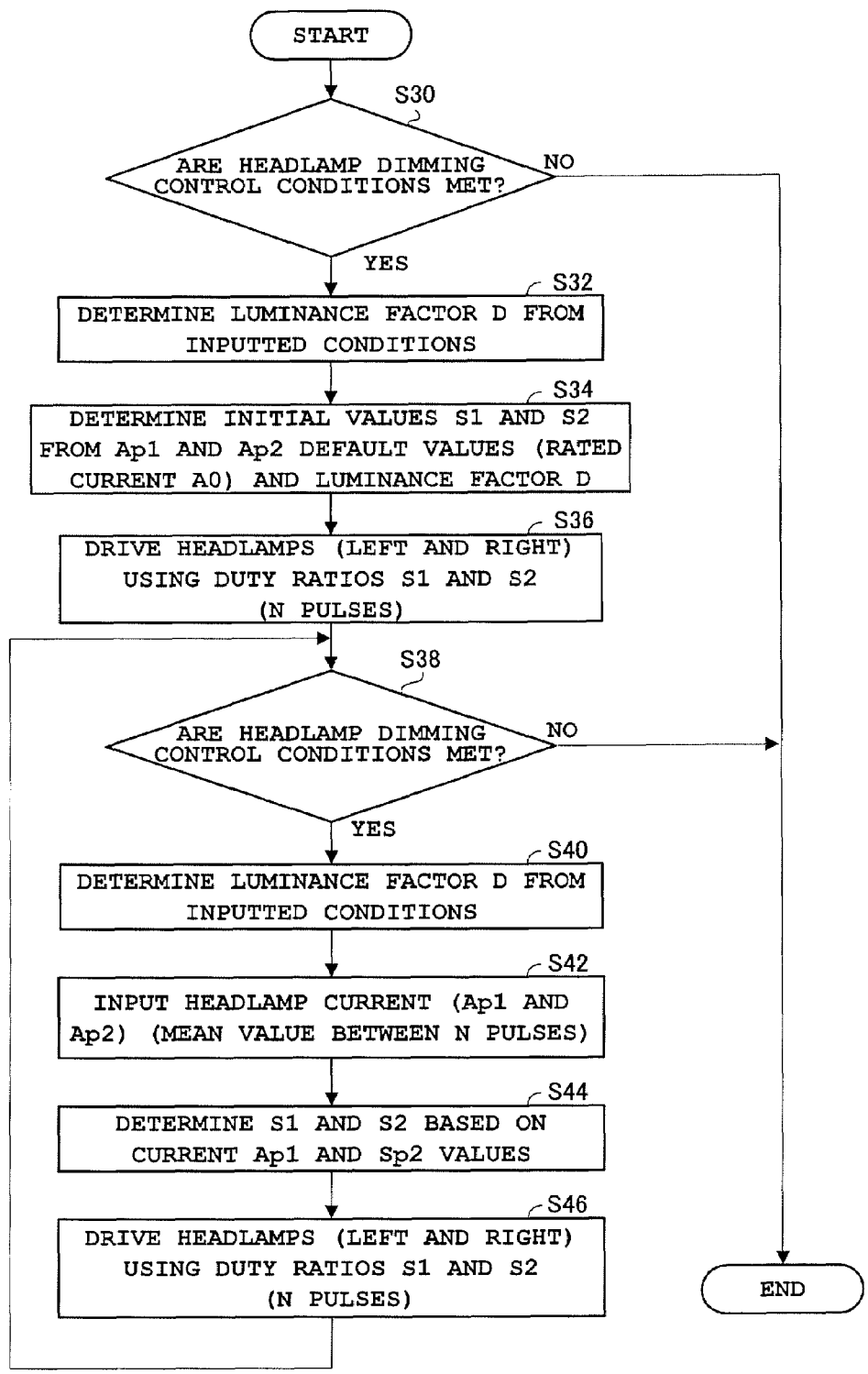
FIG. 7 is a flowchart explaining an operation performed by the headlamp luminance controlling device according to the fourth embodiment.

FIG. 7 is a flowchart of the operation performed by the headlamp luminance controlling device 20 according to the fourth embodiment.

First, the CPU 21 judges whether headlamp dimming control conditions are met based on the state of each switch 10 to switch 12 and the signal from the sensor 13 (Step S30). When the headlamp dimming control conditions are met, the CPU 21 determines the luminance factor D from the inputted conditions (Step S32). Next, the CPU 21 determines the initial values of a PWM duty ratio S1 and a PWM duty ratio S2 from the luminance factor D with a load current Ap1 and load current Ap2 as the default values (rated current A0) of the headlamp HL-R and the headlamp HL-L (Step S34). The CPU 21 drives the headlamp HL-R and the headlamp HL-L by N pulses, using the duty ratio S1 and the duty ratio S2 (Step S36). The steps S30 to S36 stated above are the operation performed at the start of PWM drive.

Next, the CPU 21 judges whether headlamp dimming control conditions are met based on the state of each switch 10 to switch 12 and the signal from the sensor 13 (Step S38). When the headlamp dimming control conditions are met, the CPU 21 determines the luminance factor D from the inputted conditions (Step S40). Next, the CPU 21 inputs the load current Ap1 and the load current Ap2 detected by the headlamp current detector 23-1 and the headlamp current detector 23-2, and calculates a mean value between N pulses (Step S42). The CPU 21 determines the PWM duty ratio S1 and the PWM duty ratio S2 based on the current load currents Ap1 and Ap2 (Step S44). The CPU 21 drives the headlamp HL-R and the headlamp HL-L using the duty ratio S1 and the duty ratio S2 (Step S46). Hereafter, the CPU 21 repeats Step S38 to Step S46 and performs PWM control of the headlamp HL-R and the headlamp HL-L until the headlamp dimming control conditions are not met.

According to the fourth embodiment described above, the relationship between the requested fade rate and the PWM duty ratio S1 and the PWM duty ratio S2 when control is actually performed can be uniquely determined. The fluctuation in the fade rate caused by fluctuations in the power supply voltage E, the wiring resistance R1, the wiring resistance R2, and the like can be suppressed. Moreover, for a load current Ap1 and a load current Ap2 of the right headlamp HL-R and the left headlamp HL-R, by controlling each headlamp HL-R and headlamp HL-L using the appropriate PWM duty ratio S1 and PWM duty ratio S2, a difference in the fade rates between the right headlamp HL-R and the left headlamp HL-R can be suppressed.

E. Fifth Embodiment

In the embodiments described above, a constant m and a constant n within the equations are determined based on a headlamp HL type. Throughout each embodiment, the constant m and the constant n are stored in a memory (not shown) provided within the CPU 21 or outside of the CPU 21. The constant m and the constant n of one type corresponding to a certain headlight HL can be stored in the memory. Alternatively, the constant m and the constant n of a plurality of types, each corresponding to several headlights HL, can be stored in the memory in the form of a table. The above-mentioned memory realizes a function of a storing means.

In the latter case, the CPU 21 acquires headlamp HL type data from an external input. The CPU 21 acquires the PWM duty ratio S based on the headlamp HL type by referencing the table. The CPU 21 controls the headlamp HL using the PWM duty ratio S. As a result, a plurality of different types of headlamps can be supported.

Here, the above-mentioned memory realizes a function of a storing means. The control performed according to the fifth embodiment is equivalent to the lighting control device being actualized, such as to include the storing means and the luminance factor deciding means. The storing means stores characteristic constants related to lighting means of differing types. The luminance factor deciding means acquires a characteristic constant of the lighting means from the storing means based on the type of lighting means, specified externally. The luminance factor deciding means determines the luminance factor of the lighting means based on the characteristic constant, the state of external switches, and a signal from an external sensor.

While the present invention has been described with reference to the preferred embodiments, it is intended that the invention be not limited by any of the details of the description therein but includes all the embodiments which fall within the scope of the appended claims.

What is claimed is:

1. A lighting control device for controlling luminance of a lighting means by performing pulse width modulation control on voltage applied to the lighting means comprising:
   a current detecting means for detecting a load current applied to the lighting means;
   a duty ratio deciding means for deciding a duty ratio used in the pulse width modulation control such that the duty ratio is $(A1/Ap)^2$, based on a theoretical value electric current A1 set based on a predetermined luminance factor provided for the lighting means and a load current Ap detected by the lead current detecting means; and
   a modulation controlling means for performing the pulse width modulation control on the voltage applied to the lighting means using the duty ratio decided by the duty ratio deciding means.

2. The lighting control device according to claim 1, comprising:
   a luminance factor deciding means for deciding a luminance factor of the lighting means based on an external switch state and a signal from an external sensor.

3. The lighting control device according to claim 1, wherein the luminance factor is consecutively changed by an external unit.

4. The lighting control device according to claim 1, wherein:
   a plurality of lighting means is provided;
   the current detecting means is provided for each of the plurality of lighting means; and
   the duty ratio deciding means decides a duty ratio used in the pulse width modulation control for each of the plurality of lighting means such that a difference in luminance among the plurality of lighting means is minimal, based on luminance factors of the plurality of lighting means and each load current of the plurality of lighting means detected by the current detecting means.

5. The lighting control device according to claim 1, further comprising:
   a storing means for storing characteristic constant numbers related to different kinds of lighting means; and
   a luminance factor deciding means for acquiring a characteristic constant number of the lighting means from the storing means based on the type of lighting means specified externally and deciding the luminance factor of the lighting means based on the characteristic constant number, an external switch state, and a signal from an external sensor.

6. A lighting control method for controlling a luminance of a lighting means by performing pulse width modulation control on voltage applied to the lighting means comprising the steps of:
   detecting a load current applied to the lighting means;
   deciding a duty ratio used in the pulse width modulation control such that the duty ratio is $(A1/Ap)^2$, based on a theoretical value electric current A1 set based on a predetermined luminance factor provided for the lighting means and a load current Ap detected by the lead current detecting means; and
   performing the pulse width modulation control on the voltage applied to the lighting means using the duty ratio decided by the duty ratio deciding means.

* * * * *